United States Patent
Sperling

(10) Patent No.: US 6,622,849 B1
(45) Date of Patent: Sep. 23, 2003

(54) HOPPER DOOR ASSEMBLY AND METHOD FOR FEEDING BULK METAL OBJECTS FROM A HOPPER

(75) Inventor: Fred S. Sperling, Canton, OH (US)

(73) Assignee: Sperling Railway Services, Inc., Canton, OH (US)

(*) Notice: Subject to any disclaimer, the term of this patent is extended or adjusted under 35 U.S.C. 154(b) by 0 days.

(21) Appl. No.: 10/256,329

(22) Filed: Sep. 26, 2002

(51) Int. Cl.[7] .............................................. B65G 47/04
(52) U.S. Cl. ........................ 198/533; 198/532; 198/540
(58) Field of Search ................................ 198/443, 453, 198/530, 532, 533, 540, 562, 550.01; 414/328, 514, 414; 221/202, 208, 247, 248, 249; 222/544, 548, 560, 541.1, 533

(56) References Cited

U.S. PATENT DOCUMENTS 766,539 A * 8/1904 Smith .......................... 198/532
3,042,261 A * 7/1962 Lovette .................... 198/540 X
4,871,059 A * 10/1989 Rantanen et al. ............ 198/532
4,925,356 A * 5/1990 Snead et al. ............. 414/519 X
4,978,252 A * 12/1990 Sperber ....................... 198/532

* cited by examiner

Primary Examiner—James R. Bidwell
(74) Attorney, Agent, or Firm—Sand & Sebolt

(57) ABSTRACT

An apparatus and method is provided for feeding bulk metal objects from a hopper supported by a frame. The hopper includes side panels that taper downwardly to form an interior chamber therebetween with upper and lower openings. Doors are hingedly attached to the side panels adjacent the lower opening and are opened and closed by piston and cylinder combinations pivotally attached to the frame and pivotally attached to members extending downwardly from the doors. Arms extend from the doors into the interior chamber to facilitate the movement of the metal objects in the hopper toward the lower opening to feed through the doors. Vibrations created by various movements of the doors also help move the metal objects toward the lower opening.

20 Claims, 5 Drawing Sheets

HOPPER DOOR ASSEMBLY AND METHOD FOR FEEDING BULK METAL OBJECTS FROM A HOPPER

BACKGROUND OF THE INVENTION

1. Technical Field

The invention relates generally to a hopper door assembly and method for feeding bulk metal objects from a hopper. More particularly, the invention relates to a hopper door assembly and method for feeding railroad spikes from a hopper onto a conveyor belt, which in turn feeds an automated spike driver. Specifically, the invention relates to a hopper door assembly with hopper doors having arms extending into the hopper which engage the spikes to assist moving and feeding them through the open doors.

2. Background Information

In the railway industry, machines for automatically driving railroad spikes in the laying of track are now commonplace. Also known are hopper and conveyor belt combinations which work in conjunction with such machines to feed those machines with railroad spikes. The present invention relates to an improved hopper door assembly and method for feeding the railroad spikes from the hopper onto the conveyor belt of such combinations.

One of the problems with the feeding of the spikes is their lack of a simple flow pattern. The spikes tend to interlock to some degree, due to their shape, and thus do not flow easily down the tapered side panels of the hopper so that they can be controllably released through an opening at the bottom of the hopper. The weight of the spikes also affects this lack of a simple flow pattern. A further factor adding to this problem is the friction between the spikes themselves and between the spikes and the side panels of the hopper, due to metal composition, shape and surface texture of the spikes. The art thus desires a hopper door assembly that allows or encourages the spikes to effectively move or flow through the outlet of a hopper.

The prior art does not address the flow problem created by the interlocking nature of the railroad spikes and other factors noted above. Previously, a substantially horizontal door was disposed at the bottom of the hopper, the door sliding horizontally between open and closed positions to respectively release and prevent release of the spikes. While this design is presumably adequate for the purpose for which it was intended, it does not address other issues present in the art.

BRIEF SUMMARY OF THE INVENTION

The invention provides doors for hopper with arms that project into the hopper to help move items through the lower opening of the hopper.

The invention also provides hopper doors that are heavy so that vibrational forces may be created by opening and closing the doors.

The invention also provides piston and cylinder combinations with sufficient force to create vibrations when opening and closing the doors.

The invention provides a door assembly for feeding bulk items from a hopper which has sidewalls that define a lower opening. The door assembly includes first and second opposed doors pivotally connected to the sidewalls, the doors being movable between open and closed positions. The lower opening is closed when the doors are closed and open when the doors are open. At least one arm is connected to at least one of the doors. The at least one arm extends into the hopper when the doors are closed.

The invention also provides a method for feeding bulk items from a hopper comprising the steps of providing a door assembly for feeding bulk items from a hopper; providing items in bulk; placing at least some of the items in the hopper; and opening the doors at least partially to release at least one of the items through the lower opening.

BRIEF DESCRIPTION OF THE DRAWINGS

Similar numerals refer to similar parts throughout the drawings.

DETAILED DESCRIPTION OF THE INVENTION

Figure 1:
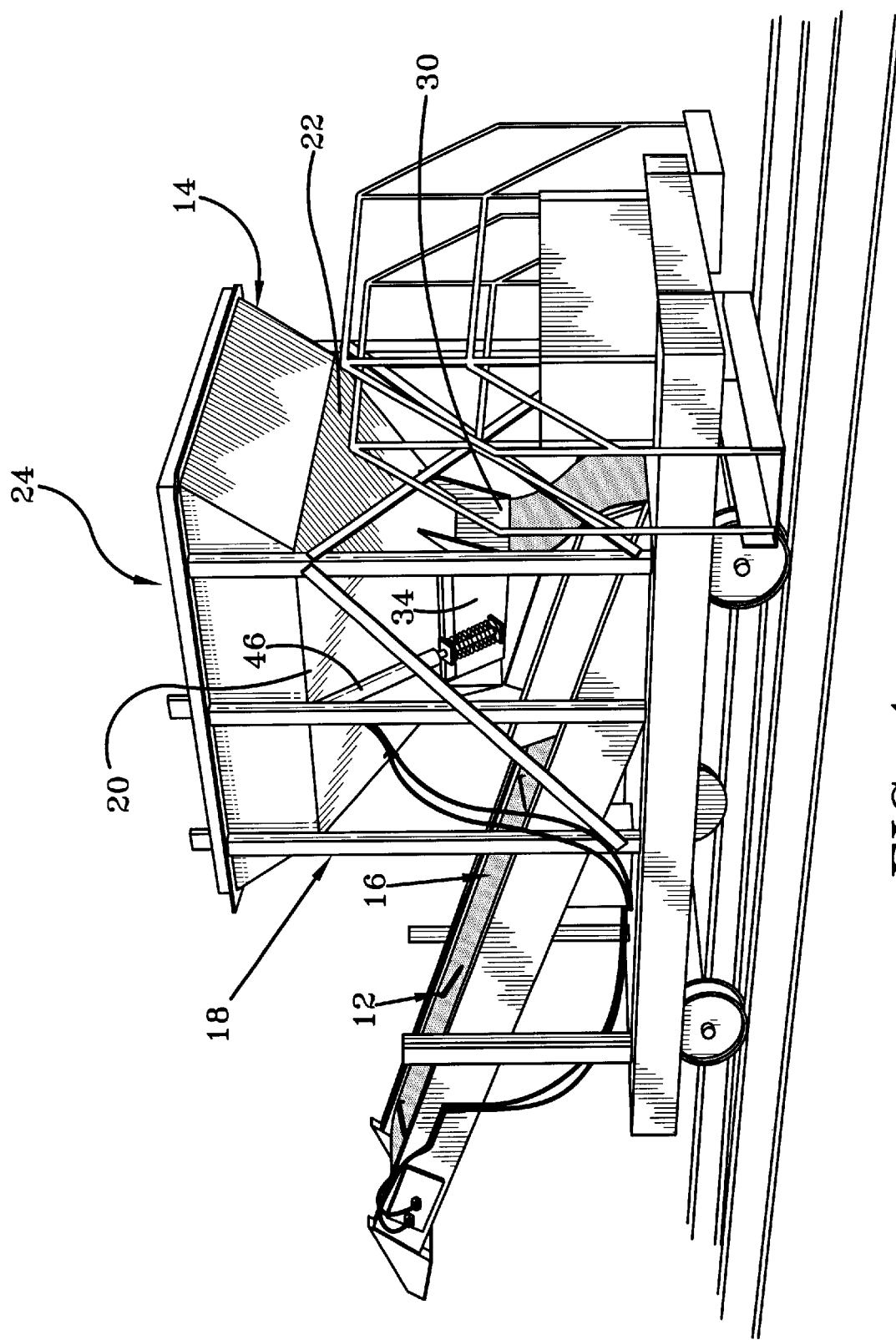
FIG. 1 is a perspective view of the hopper door assembly of the present invention attached to a hopper and conveyor belt.
Figure 2:
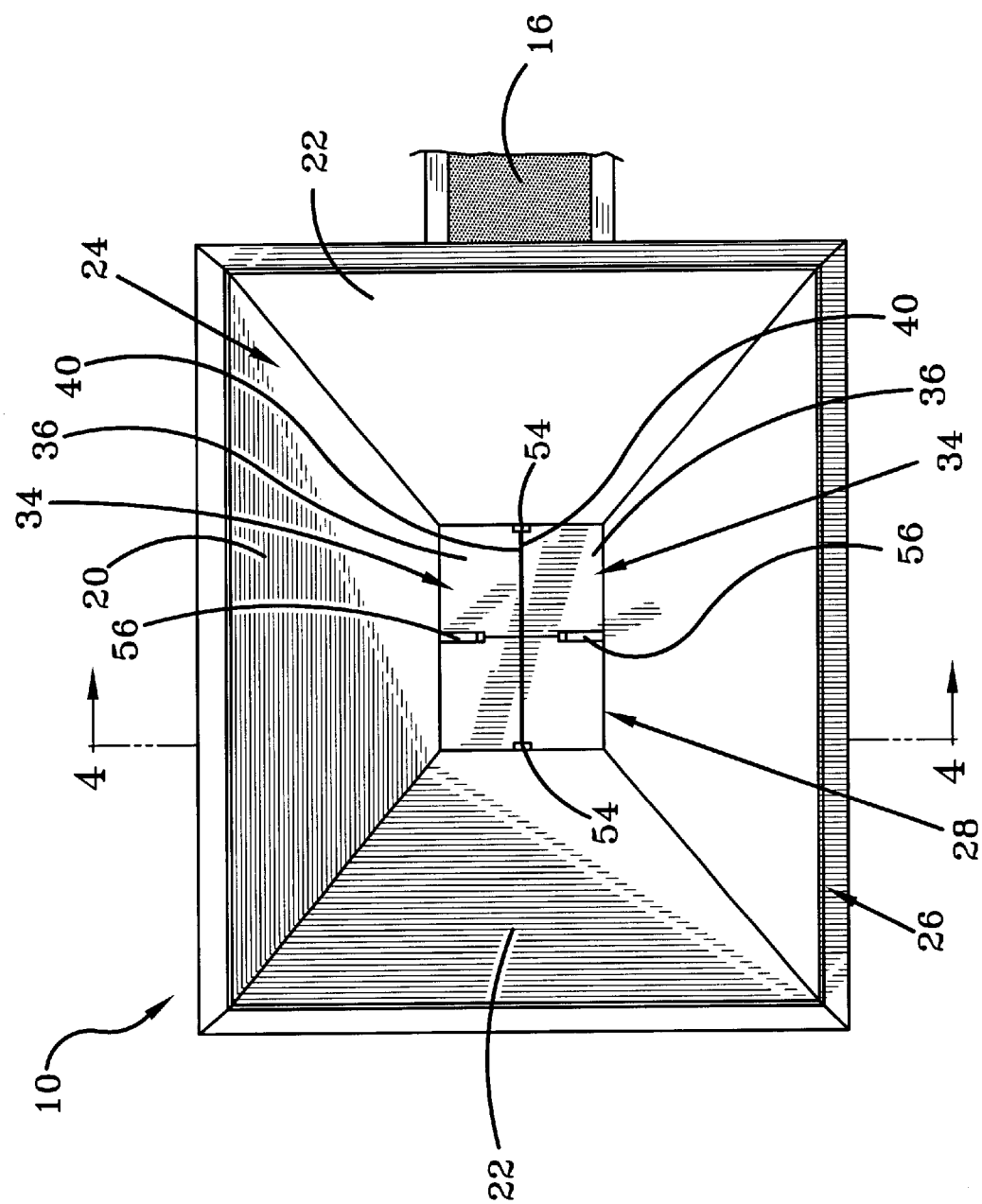
FIG. 2 is a fragmentary top plan view of the hopper door assembly with the doors in the closed position.
Figure 3:
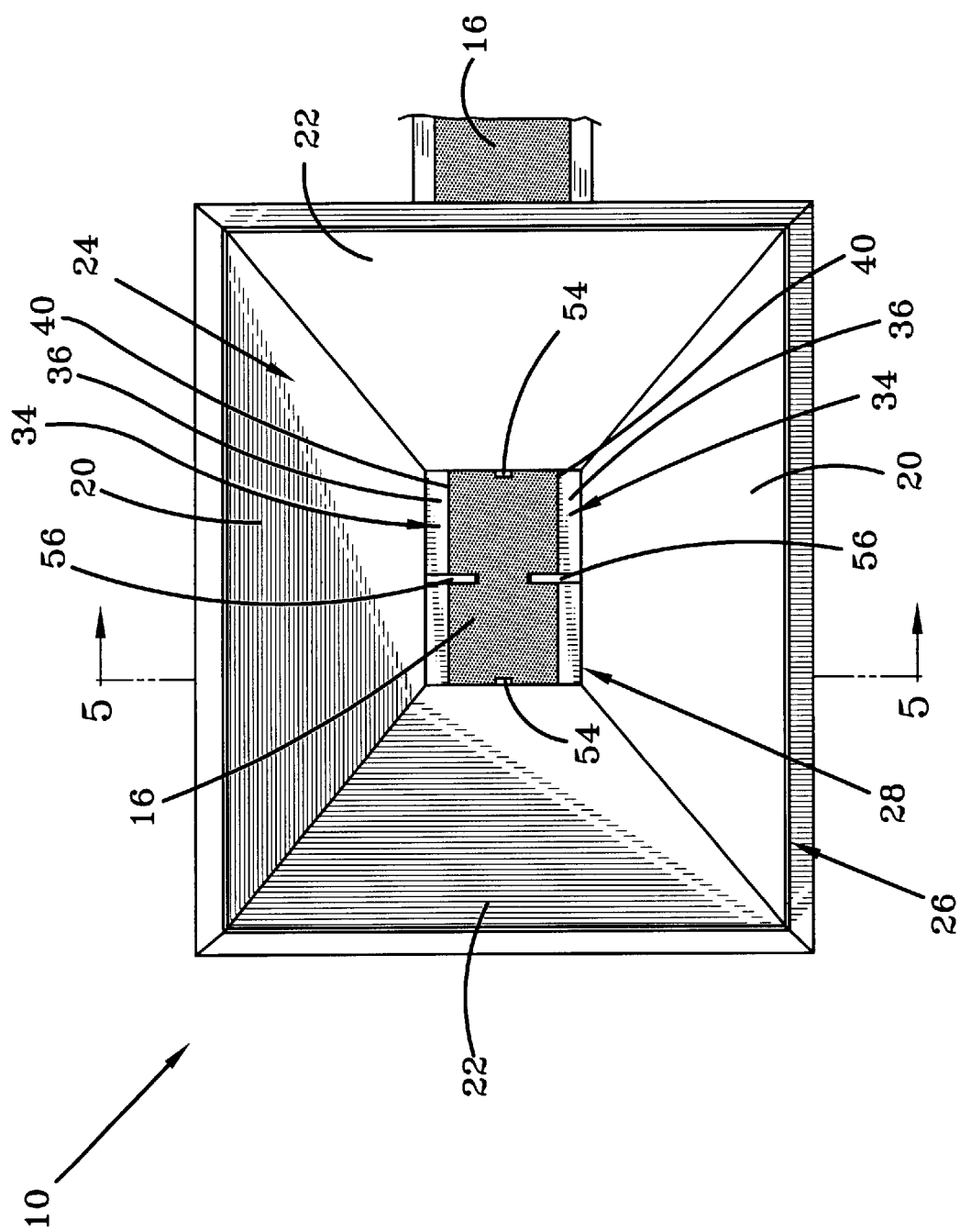
FIG. 3 is a fragmentary top plan view of the hopper door assembly with the doors in the open position.

The improved hopper door assembly of the present invention is indicated generally at 10, and is shown in FIGS. 2–5. As further described below, hopper door assembly 10 includes doors 34 having arms 56 extending therefrom. Assembly 10 may also include end plates 30 with stops 54 mounted thereon, and linear actuators 46 for opening and closing doors 34. Hopper door assembly 10 facilitates feeding metal objects, such as railroad spikes 12, from a hopper 14 onto a conveyor belt 16 below hopper 14. Conveyor belt 16 may feed an automatic spike driver or another type of machine. Assembly 10 also prevents overfeeding of spikes 12 onto conveyor belt 16.

Hopper 14 is supported by a frame 18 and may be an inverted hollow frustum of a right rectangular pyramid. Other shapes may be used. Hopper 14 includes a pair of opposed trapezoidal side panels 20 and a pair of opposed trapezoidal end panels 22. Panels 20 and 22 taper downwardly and define an interior chamber 24 therebetween and further define upper and lower openings 26 and 28, both rectangular in shape. Hopper 14 is adapted to receive and direct a plurality of objects to be fed, such as a plurality of railroad spikes.

Assembly 10 includes a pair of rectangular end plates 30 having inner surfaces 32 and extending downwardly, each from one end panel 22 adjacent lower opening 28. A pair of opposed doors 34, each having an inner surface 36, an outer surface 38 and a terminal edge 40, are each hingedly connected to one side panel 20 adjacent lower opening 28. A leg member 42 having a pivot point 44 extends downwardly from outer surface 38 of each door 34. A pair of linear actuators 46, shown as hydraulic piston and cylinder combinations including springs 47, each have a first end 48 and a second end 50. Each first end 48 is pivotally connected to pivot point 44 of one leg member 42 and each second end 50 is pivotally connected to one of pivot points 52 on frame 18. Pivot point 44 may also be connected to door 34 and pivot point 52 may also be connected to hopper 14. A pair of stops 54 extend inwardly, one from each end plate 30. An arm 56 extends from inner surface 36 of each door 34 into interior chamber 24. Arms 56 are substantially straight rods that extend perpendicularly from doors 34, but may vary in shape and may extend at different angles. End plates 30 cover the space that would be left open between doors 34 adjacent end panels 22 and thus prevent railroad spikes 12 from falling out therefrom. End plates 30 also serve as a foundation for stop 54. Doors 34 open and close to control the release of railroad spikes through lower opening 28. Linear actuators 46 move between open and closed positions to open and close doors 34. Stops 54 limit the movement of doors 34 into hopper 14 and define a closed position for doors 34.

Figure 4:
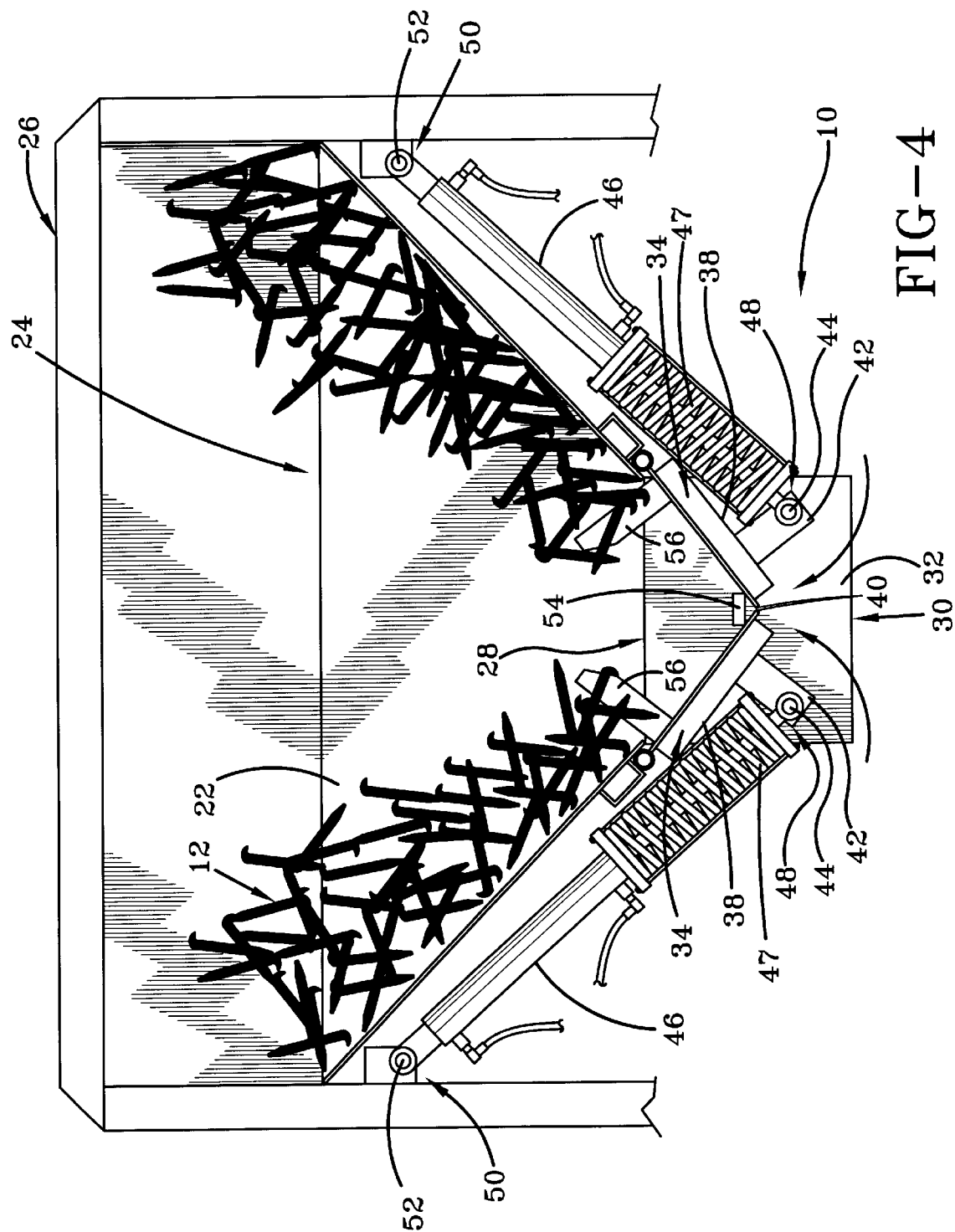
FIG. 4 is a fragmentary sectional view of the hopper door assembly taken on line 4—4 of FIG. 2, with railroad spikes also shown.
Figure 5:
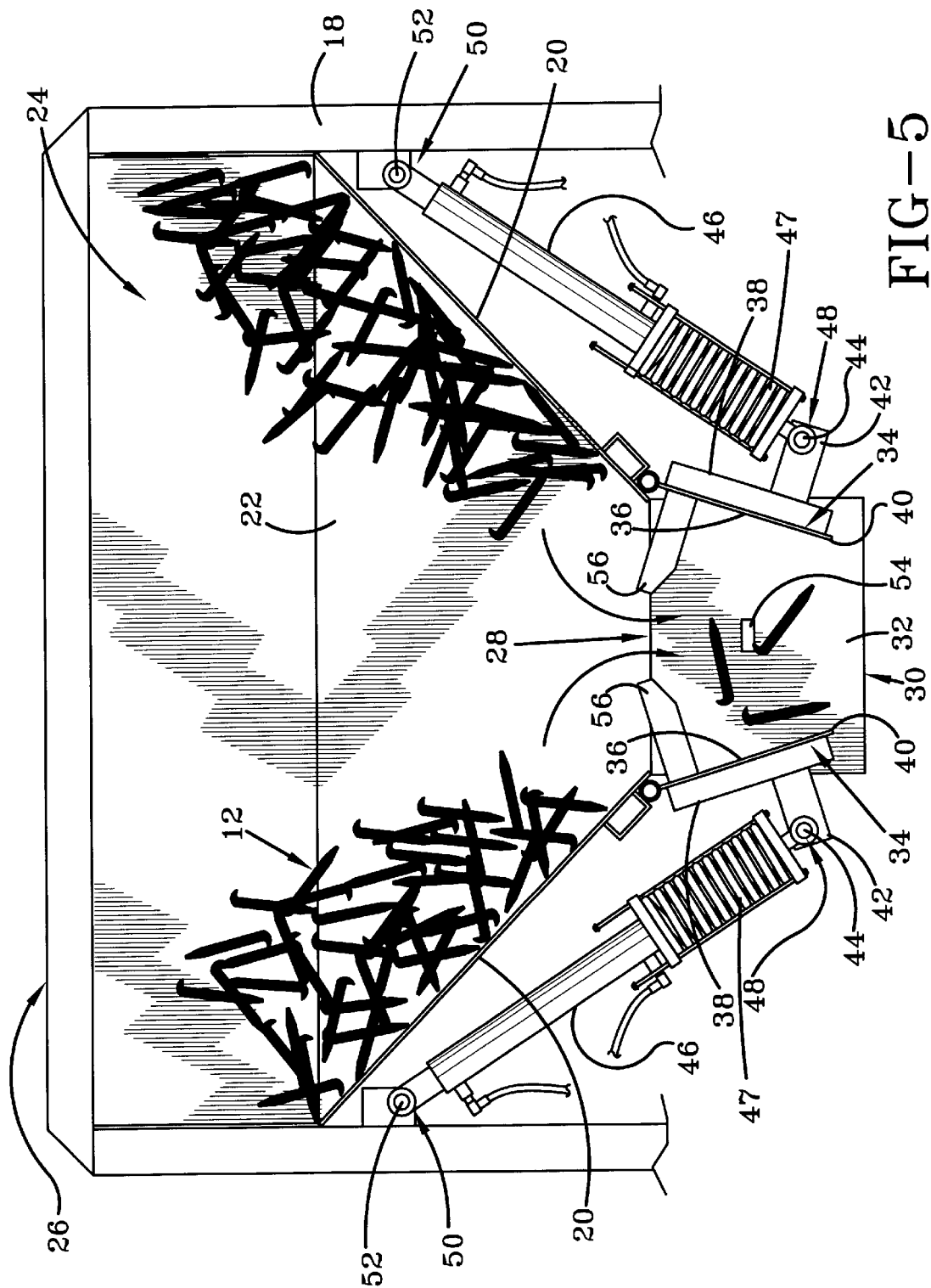
FIG. 5 fragmentary sectional view of the hopper door assembly taken on line 5—5 of FIG. 3, with railroad spikes also shown.

Each door 34 weighs forty-five pounds. Preferably, each door 34 should weigh between thirty and eighty pounds as explained below. The doors have closed and open positions, as shown in FIGS. 4 and 5, respectively. Inner surfaces 36 of doors 34 contact stops 54 when doors 34 are in the closed position. Terminal edges 40 of doors 34 are parallel and abut one another or lie closely adjacent in the closed position. The preferred maximum normal distance between terminal edges 40 of doors 34 in the open position is 5⅜ inches when used to feed railroad spikes 12, which limits the number of spikes 12 released at a given time. This distance may vary, especially where the bulk objects to be fed from hopper 14 are not railroad spikes.

The apparatus functions as follows. Generally, railroad spikes 12, or bulk metal objects generally, are loaded into hopper 14 through upper opening 26, and doors 34 are opened to release some spikes 12 through lower opening 28 onto conveyor belt 16. However, spikes 12 tend not to slide down panels 20 and 22 of hopper 14 without some prompting, as described above in the Background Information section.

Thus, in accordance with one of the features of the present invention, arms 56 engage and move spikes 12 as doors 34 are opened or closed by the action of linear actuators 46. Arms 56 sometimes directly pull spikes 12 downward toward lower opening 28 and sometimes jostle spikes 12 into new positions to help maneuver them toward lower opening 28. Arms 56 can move spikes 12 as doors 34 close or open.

In accordance with another feature of the present invention, the mass of doors 34 is used in conjunction with piston and cylinder combinations 46 to vibrate hopper 14 and spikes 12 to encourage spikes 12 to move downward toward lower opening 28. Linear actuators 46 may be powered hydraulically, although other appropriate means may be used, such as pneumatic, electric or mechanical. Actuators 46 are powered sufficiently to move doors 34 to create vibrations, but with force limited to prevent bending doors 34. Where the linear actuators 46 are piston and cylinder combinations, springs 47 do not add significantly to the force of actuator 46, but help keep doors 34 closed to prevent unintended release of spikes 12. Sufficient mass of doors 34 is important in creating vibrations substantial enough to move spikes 12. As noted above, each door 34 should weigh between thirty and eighty pounds when used to hold spikes 12. Lesser weights may be used when hopper 14 is used to hold metal objects weighing less.

These vibrations are created in various ways. Doors 34 can move in closing and opening directions, as shown by the arrows in FIGS. 4 and. 5, respectively. When moving in either direction and then suddenly stopped, vibrations are created. Similarly, moving doors 34 back and forth quickly between the opening and closing directions creates a shaking motion that creates vibrations. Doors 34 may be slammed shut to the closed position, wherein terminal edges 40 of doors 34 contact one another or inner surfaces 35 of doors 34 contact stops 54 to create vibrations. This method of creating vibrations may be used in conjunction with arms 56 engaging spikes 12 in order to move spikes 12 toward lower opening 28.

To limit the number of spikes 12 released at a given time, doors 34 are preferably set to open so that the maximum normal distance between the terminal edges 40 of doors 34 is 5⅜ inches. This distance may vary, as noted above, especially when the objects to be released from hopper 14 are not railroad spikes.

In the foregoing description, certain terms have been used for brevity, clearness and understanding, but no unnecessary limitations are to be implied therefrom beyond the requirement of the prior art, because such terms are used for descriptive purposes and are intended to be broadly construed. Moreover, the description and illustration of the invention is by way of example, and the scope of the invention is not limited to the exact details shown or described.

Having now described the features, discoveries and principles of the invention, the manner in which the improved apparatus for feeding bulk metal objects from a hopper is constructed and used, the characteristics of the construction, and the advantageous, new and useful results obtained; the new and useful structures, devices, elements, arrangements, parts and combinations are set forth in the appended claims.

What is claimed is:

1. A door assembly for feeding bulk items from a hopper; the hopper being supported by a frame and having panels defining a lower opening; the assembly comprising:
 a pair of doors each adapted to be hingedly connected to the hopper;
 a pair of linear actuators each having a first end and a second end, each first end pivotally connected to a respective door and each second end pivotally connected to one of the frame and hopper;
 at least one arm extending from at least one of the doors into the hopper; the arm being adapted to move with the door to help feed items from the hopper through the lower opening.

2. The assembly as defined in claim 1 in which each door has an outer surface; a leg member having a pivot point extends from the outer surface of each door; and the first end of each actuator is pivotally connected to the pivot point of a respective leg member.

3. The assembly as defined in claim 1 in which each of the doors weighs between thirty and eighty pounds.

4. The assembly as defined in claim 1 in which the doors have an open position and respective terminal edges; and the normal distance between the terminal edges of the doors in the open position is 5⅜ inches.

5. The assembly as defined in claim 1 in which the doors have a closed position and respective terminal edges which abut one another in the closed position.

6. The assembly as defined in claim 1 in which a pair of end plates extend downwardly from the hopper adjacent the lower opening.

7. The assembly as defined in claim 6 in which at least one stop extends from at least one of the end plates; and the doors contact the at least one stop when the doors are closed.

8. A door assembly for feeding bulk items from a hopper; the hopper having a sidewall that defines a lower opening; the door assembly comprising:

first and second opposed doors pivotally connected to the sidewall, the doors movable between open and closed positions;

the lower opening being closed when the doors are closed;

the lower opening being open when the doors are open; and at least one arm connected to at least one of the doors; the at least one arm extending into the hopper when the doors are closed.

9. The door assembly defined in claim 8 wherein the at least one arm extends perpendicularly from the at least one door.

10. The door assembly defined in claim 8 wherein at least one stop is connected to the hopper which engages the doors in the closed position.

11. The door assembly defined in claim 8 wherein each door is respectively connected to a linear actuator which opens and closes the doors.

12. The door assembly defined in claim 8 wherein the weight of each door is between 30 and 80 pounds.

13. A method for feeding bulk items from a hopper comprising the steps of:

providing a door assembly for feeding bulk items from a hopper; the hopper having a sidewall that defines a lower opening; the door assembly comprising:

first and second opposed doors pivotally connected to the sidewall, the doors movable between open and closed positions;

the lower opening being closed when the doors are closed;

the lower opening being open when the doors are open; and at least one arm connected to at least one of the doors; the at least one arm extending into the hopper when the doors are closed providing items in bulk;

placing at least some of the items in the hopper; and opening the doors at least partially to release at least one of the items through the lower opening.

14. The method as defined in claim 13 in which the opening step includes the at least one arm engaging at least one item to assist in moving at least one item toward the lower opening.

15. The method as defined in claim 13 further including the step of closing the doors so that the at least one arm engages at least one item to assist in moving at least one item toward the lower opening.

16. The method as defined in claim 13 further including the step of moving the doors in a manner that creates vibrations sufficient to assist moving at least one item toward the lower opening.

17. The method as defined in claim 13 further including the steps of:

providing at least one stop connected to the hopper which contacts the doors in the closed position;

closing the doors with sufficient force so that the contact between the at least one stop and the doors creates vibrations sufficient to assist moving at least one item toward the lower opening.

18. The method as defined in claim 13 further including the steps of:

providing doors which move in opening and closing directions; and moving the doors back and forth in the opening and closing directions in a manner that creates vibrations sufficient to assist moving at least one item toward the lower opening.

19. The method as defined in claim 13 further comprising the steps of:

providing doors which move in opening and closing directions;

moving the doors in one of the opening and closing directions; and stopping the movement of the doors in a manner that creates vibrations sufficient to assist moving at least one item toward the lower opening.

20. The method as defined in claim 13 further including the steps of:

providing doors with terminal edges that contact one another when the doors are closed; and closing the doors with sufficient force so that the contact between the terminal edges of the doors creates vibrations sufficient to assist moving at least one item toward the lower opening.

* * * * *